United States Patent
Kolodji (10) Patent No.: US 11,383,199 B1
(45) Date of Patent: Jul. 12, 2022

(54) PROCESS AND SYSTEM FOR LOW PRESSURE CO2 CAPTURE AND BIO-SEQUESTRATION

(71) Applicant: Brian Kolodji, Bakersfield, CA (US)

(72) Inventor: Brian Kolodji, Bakersfield, CA (US)

(73) Assignee: Black Swan, LLC, Bakersfield, CA (US)

( * ) Notice: Subject to any disclaimer, the term of this patent is extended or adjusted under 35 U.S.C. 154(b) by 362 days.

(21) Appl. No.: 16/372,060

(22) Filed: Apr. 1, 2019

Related U.S. Application Data (60) Provisional application No. 62/651,039, filed on Mar. 30, 2018.

(51) Int. Cl.
*B01D 53/22* (2006.01)
*B01D 53/73* (2006.01)
(Continued)

(52) U.S. Cl.
CPC ............. *B01D 53/229* (2013.01); *A01G 7/02* (2013.01); *A01G 9/18* (2013.01); *B01D 53/228* (2013.01);
(Continued)

(58) Field of Classification Search
CPC .... B01D 53/229; B01D 53/228; B01D 53/62; B01D 53/73; B01D 69/04; B01D 69/06;
(Continued)

(56) References Cited

U.S. PATENT DOCUMENTS

| 4,073,089 A | | 2/1978 | Maginnes et al. | |
|---|---|---|---|---|
| 5,034,126 A | * | 7/1991 | Reddy | B01D 63/10 210/321.74 |

(Continued)

OTHER PUBLICATIONS

C. Maidana et al., Reduction of Fuel Consumption and Emissions of a Gas Turbine by Using of Oxygen-Enriched Combustion, 2nd Oxyfuel Combustion Conference.
(Continued)

*Primary Examiner* — Anthony R Shumate
(74) *Attorney, Agent, or Firm* — James M. Duncan; Scanlon Duncan LLP (57) ABSTRACT

A flue gas extraction system provides extraction, collection, cooling, enriching and distributing flue gas from a vent stack of a stationary flue gas generator to carbon dioxide consuming crops, orchards, and other photosynthetic organisms. The collected flue gas is processed through the system to achieve optimal temperature, pressure, flowrate, water content and carbon dioxide concentration for application to plants for increasing plant productivity and sequestering the carbon dioxide. The gas distribution network may have one or more membrane modules which receive a low pressure gas mixture, where the membrane modules are utilized to enrich the CO2 concentration and to separate out a nitrogen rich component from the flue gas. Application of carbon dioxide may be supplemented by providing additional components to the plants which maintain a level of fertilization and irrigation suitable for the increased biomass and water utilization efficiency of the plants resulting from the increased intake of carbon dioxide.

18 Claims, 10 Drawing Sheets

(51) Int. Cl.
    *A01G 7/02*    (2006.01)
    *A01G 9/18*    (2006.01)
    *B01D 69/04*   (2006.01)
    *B01D 69/06*   (2006.01)
    *B01D 69/08*   (2006.01)
    *B01D 53/62*   (2006.01)

(52) U.S. Cl.
    CPC ............ *B01D 53/62* (2013.01); *B01D 53/73* (2013.01); *B01D 69/04* (2013.01); *B01D 69/06* (2013.01); *B01D 69/08* (2013.01); *B01D 2053/224* (2013.01); *B01D 2256/22* (2013.01); *B01D 2257/504* (2013.01); *B01D 2258/0291* (2013.01); *B01D 2311/06* (2013.01); *B01D 2313/12* (2013.01); *B01D 2313/22* (2013.01); *B01D 2313/38* (2013.01); *B01D 2313/90* (2013.01); *B01D 2317/025* (2013.01)

(58) Field of Classification Search
    CPC ............ B01D 69/08; B01D 2053/224; B01D 2256/22; B01D 2257/504; B01D 2258/0291; B01D 2311/06; B01D 2313/12; B01D 2313/22; B01D 2313/38; B01D 2313/90; B01D 2317/025; A01G 7/02; A01G 9/18
    See application file for complete search history.

(56) References Cited

U.S. PATENT DOCUMENTS

| | | | | |
|---|---|---|---|---|
| 5,071,451 | A * | 12/1991 | Wijmans | B01D 53/229 95/47 |
| 5,682,709 | A | 11/1997 | Erickson | |
| 6,108,967 | A | 8/2000 | Erickson | |
| 6,237,284 | B1 | 5/2001 | Erickson | |
| 6,745,580 | B1 * | 6/2004 | Brown | F24F 13/222 137/192 |
| 7,842,264 | B2 | 11/2010 | Cooper et al. | |
| 8,197,857 | B2 | 6/2012 | Dressler et al. | |
| 8,252,091 | B2 | 8/2012 | Anand et al. | |
| 8,595,020 | B2 | 11/2013 | Marino | |
| 8,617,292 | B2 * | 12/2013 | Hasse | B01D 53/229 95/51 |
| 8,852,319 | B2 | 10/2014 | Wijmans et al. | |
| 8,889,400 | B2 | 11/2014 | Martin et al. | |
| 8,999,038 | B2 * | 4/2015 | Ungerank | B01D 53/226 95/51 |
| 9,266,057 | B1 | 2/2016 | Jones | |
| 9,359,750 | B1 * | 6/2016 | Perez | E03C 1/286 |
| 9,433,887 | B2 | 9/2016 | Wijmans et al. | |
| 9,433,896 | B2 | 9/2016 | Eisenberger | |
| 9,514,493 | B2 | 12/2016 | Marino | |
| 2004/0211726 | A1 * | 10/2004 | Baig | B01D 61/36 210/640 |
| 2010/0205960 | A1 | 8/2010 | McBride et al. | |
| 2010/0210745 | A1 * | 8/2010 | McDaniel | C09D 5/1668 521/55 |
| 2011/0005272 | A1 * | 1/2011 | Wijmans | B01D 53/225 62/617 |
| 2011/0195473 | A1 | 8/2011 | Wilhelm | |
| 2012/0009109 | A1 * | 1/2012 | Wright | B01D 53/864 423/239.1 |
| 2012/0171053 | A1 * | 7/2012 | Wang | F04B 33/005 417/63 |
| 2013/0058853 | A1 * | 3/2013 | Baker | F02C 3/34 423/228 |
| 2014/0286797 | A1 * | 9/2014 | Tamm | F04C 19/00 417/68 |
| 2015/0292807 | A1 * | 10/2015 | Romeo | F28D 15/02 165/104.21 |
| 2017/0271701 | A1 * | 9/2017 | Berlowitz | H01M 8/141 |
| 2017/0341942 | A1 * | 11/2017 | Harper, Jr. | C12M 43/06 |
| 2020/0056578 | A1 * | 2/2020 | Sheldon-Coulson | B63B 35/44 |
| 2020/0141410 | A1 * | 5/2020 | Kawasaki | F04C 19/001 |

OTHER PUBLICATIONS

B.A. Kimball et al. Effects of Increasing Atmospheric CO2 on Vegetation printed in CO2 and Biosphere by J. Rozema et al. at p. 65, Kluwer Academic Publishers, 1993.

L Brinkman, Theoretical and Experimental Investigations of Flat Sheet Membrane Module Types for High Capacity Gas Separation Applications, Chemie Ingenie Technik, vol. 85, Issue 8, pp. 1210-1220, May 17, 2013.

B. A. Kimball et al, Seventeen Years of Carbon Dioxide Enrichment of Sour Orange Trees: Final Results, Global Change Biology (2007) 13, 2171-2183.

T.C. Merkel et al, Power Plant Post-Combustion Carbon Dioxide Capture: An Opportunity for Membranes, Journal of Membrane Science 359 (2010) 126-139.

* cited by examiner

PROCESS AND SYSTEM FOR LOW PRESSURE CO2 CAPTURE AND BIO-SEQUESTRATION

RELATED APPLICATIONS

This application claims domestic priority to U.S. provisional application 62/651,039 filed Mar. 30, 2018

BACKGROUND OF THE INVENTION

This invention relates to capturing carbon dioxide and making beneficial use of the captured gas. This invention more specifically relates to capturing carbon dioxide and distributing and applying the gas to carbon dioxide absorbing plants for bio-sequestration of the gas or for consumption through photosynthesis. The application of carbon dioxide to the plants promotes growth in the plant, such that the plant has more robust root and shoot systems. In addition, application of the gas to cultivated plants increases crop yield per harvest, improves the size and quantity of fruit, and/or improves the productivity by allowing earlier harvests or multiple harvests.

While carbon dioxide provides a benefit to plants, it is a major contributor to global warming. Global warming is a result of increasing concentrations of greenhouse gases ("GHG") in the atmosphere. Among the primary greenhouse gases are water vapor, carbon dioxide, methane, nitrous oxide, perfluorocarbons, hydrofluorcarbons, and sulfur hexafluoride. Of these, carbon dioxide is the primary anthropogenic (i.e, manmade) GHG, accounting for a substantial portion of the human contribution to the greenhouse effect in recent years. The combustion of fossil fuels is a major source of anthropogenic carbon dioxide, where the combustion may occur in mobile and stationary devices. In, 2006, reports from NASA and the US Department of Energy report that 9 gigatons of GHG is annually added to the atmosphere worldwide by manmade processes, such as fossil fuel combustion and/or flue gas sources. It is estimated that the minimum amount of CO2 required to be removed from the atmosphere to stop the advance of climate change is 4 gigatons per year.

A flue gas is a gas which exits a flue gas generator to the atmosphere via a flue (i.e., a pipe or conduit) which conveys exhaust gases from the flue gas generator. The stream of flue gas normally contains elevated concentrations of carbon dioxide. Because flue gas contains a significant percentage of carbon dioxide—e.g., 5% or 50,000 parts-per-million—relative to only a few hundred parts-per-million carbon dioxide in the atmosphere, flue gas provides a substantial contribution to the atmospheric GHG. Thus, per the United States Environmental Protection Agency and state statutory schemes (e.g., California SB 32), the management of carbon dioxide merits a review of flue gas sources and consideration of systems and methods for capturing carbon dioxide from the flue gas.

Examples of flue gas generators are industrial steam generators, power plants, syngas plants, residential water heaters, and heater furnaces. Flue gas is defined as the combustion products of a hydrocarbon fuel and air and/or a water shift reaction product from a syngas plant. The hydrocarbon fuel can be natural gas, propane, gasoline, and other fuels. Dry air is composed of approximately 79 percent nitrogen, approximately 21 percent oxygen, water content which in humid air is usually under 10 percent and other trace components in the parts per million, including carbon dioxide at between 300 to 400 ppm. The direct combustion products resulting in flue gas contain elevated levels of carbon dioxide (usually under 10 percent) and water (usually under 30 percent). Also contained in the gas is relatively inert nitrogen which passes through the flue gas generator along with any excess uncombusted oxygen. These combustion products are produced at an elevated temperature usually in a firing chamber at hundreds of degrees Fahrenheit, and low pressures, usually near atmospheric.

Thus, flue gases have high temperature, low pressure, and relatively high carbon dioxide concentration with respect to the normal concentration in air. Because the sources of flue gas are ubiquitous, capturing even a modest portion of the carbon dioxide from flue gas yields meaningful results in decreasing carbon dioxide releases to the atmosphere. However many of the known systems for separation, concentration and capture of carbon dioxide from flue gas, such as absorption, adsorption, cryogenic distillation, and membrane separation, can be complicated and energy intensive, making the proposed systems positive greenhouse gas contributors. These systems can also be very expensive, at typical costs ranging from $200 to $300 per ton of removed CO2. Thus, the approximate expense of utilizing these systems for removing the 4 gigatons CO2 required to stop the advance of global warming, as discussed above, would be about $1 trillion dollars/year, which is on the order of the annual budget for the United States government—in other words, achieving the required CO2 removal by utilizing the known systems for artificial sequestration alone is not an economically feasible solution to the GHG problem.

In contrast to the artificial carbon dioxide sinks are the natural sequestration systems, which include the oceans, soils, forests, plants and micro-organisms. The biomass (roots, leaves, branches, etc.) of trees and plants are estimated by the US DOE in 2008 to currently hold approximately 550 gigatons CO2 worldwide, with photosynthesis in such biomass removing approximately 60 gigatons carbon dioxide per year, as follows: (1) forests removing approximately 10 gigatons; (2) permanent crops (orchards, vineyards) 3 gigatons; (3) annual (row) crops removing 11 gigatons; and (4) pasture land removing 36 gigatons. Increasing the amount of carbon dioxide naturally sequestered in plant biomass would be very desirable, particularly because of the positive impact carbon dioxide has on plant growth and productivity.

A system which efficiently, effectively and inexpensively captures and sequesters carbon dioxide without additional GHG contribution is desirable. A system which accomplishes these goals while also making beneficial use of the captured carbon dioxide is particularly desirable.

SUMMARY OF THE INVENTION

Embodiments of the method and apparatus disclosed herein provide a solution to the problems described above. The present invention provides CO2 to plants in concentrations and temperatures which are beneficial to the plants. In providing CO2 to plants, the present invention captures CO2 from a stationary flue gas generator from the atmosphere. Once captured, the CO2 may, as necessary, be cooled, diluted, dewatered, and/or concentrated and then distributed to the plants. In all embodiments, a membrane system is utilized to separate the CO2 from other components and, if desired, to concentrate the CO2. The collected CO2 is processed through the system to achieve optimal temperature, pressure, flowrate, CO2 concentration, nutrient levels and/or water content. Application of CO2 may be supplemented by providing additional components directly to the plants which maintain a level of fertilization and irrigation suitable for the increased biomass (including yield of crop) and water utilization efficiency resulting from the increased intake of carbon dioxide by the plants.

An embodiment of the invention has a gas distribution network connected to the main duct. The gas distribution network receives a gas mixture from the venting stack. Because of the low anticipated pressures, the gas distribution network may be configured from thin-walled ducting material. The gas distribution network may have one or more membrane modules which receive a low pressure gas mixture, where the membrane modules are utilized to enrich the CO2 concentration and to separate out a nitrogen rich component from the flue gas. The membranes may be of the spiral wound, hollow fiber, of flat sheet type. Alternatively, a leaf membrane structure disposed directly within a portion of the distribution duct may be used as a substitute for a membrane module. As the leaf membrane configuration may be configured with multiple membranes sequentially staged in which the carbon dioxide concentration increases at each stage. The various leaf membrane configurations are hereinafter collectively to an "inline leaf membrane" regardless of the number of stages.

The known membranes are sensitive to high temperature. Because flue gas discharged from a typical flue gas source may have a temperature exceeding 300 degrees Fahrenheit, cooling of the gas is required prior to contact with any membrane system. In some cases, lengthy runs and/or dilution with ambient air may be sufficient to cool the gas long to allow sufficient cooling of the gas, say to approximately 100 degrees Fahrenheit, to prevent damage to the membrane system. However, for close coupled systems, where the flue gas source is close to the crops to be treated, some type of cooling system is desirable. In such cases, an alternative embodiment of the invention utilizes quenching towers to lower the temperature of the flue gas.

The gas distribution manifold comprises at least one manometric trap for water condensate drainage from the gas mixture. Embodiments of the invention have a distribution array which is disposed amongst photosynthetic organisms, such as in an agricultural field utilized for growing plants. The distribution array may comprise a blower, a valve and plurality of gas emitters through which the gas mixture may be selectively discharged amidst the plants upon activation of the valve. It is to be appreciated that as a gas stream flows through the components of the system, including flow through coolers, membrane modules or inline leaf membrane, the gas stream cools to a temperature which is sufficiently low to be to be safely processed through the systems components and to be administered to the photosynthetic organisms. As the gas stream cools, condensation occurs and the moisture content decreases, and liquid water condensate is collected and drained from the system.

The gas mixture may be discharged through a network of perforated tubing or open end ducting set amongst plants in a field thus providing a warm moist carbon-dioxide enriched micro-environment around the plants. Through photosynthesis the plants convert water and carbon-dioxide in the biosphere (air surrounding the plants) to cellulosic plant building blocks and oxygen, while carbon dioxide is also organically sequestered in the plant biomass, resulting in larger root and shoot systems. Thus, embodiments of the disclosed system utilize the captured carbon dioxide, as well as the elevated (with respect to ambient conditions) of humidity and temperature, for a beneficial purpose.

Embodiments of the system and process may further utilize carbon dioxide containment mechanisms such as sheeting and draping to provide a barrier which contains the carbon dioxide enriched air adjacent to the plants.

DETAILED DESCRIPTION OF THE EMBODIMENTS

Figure 1:
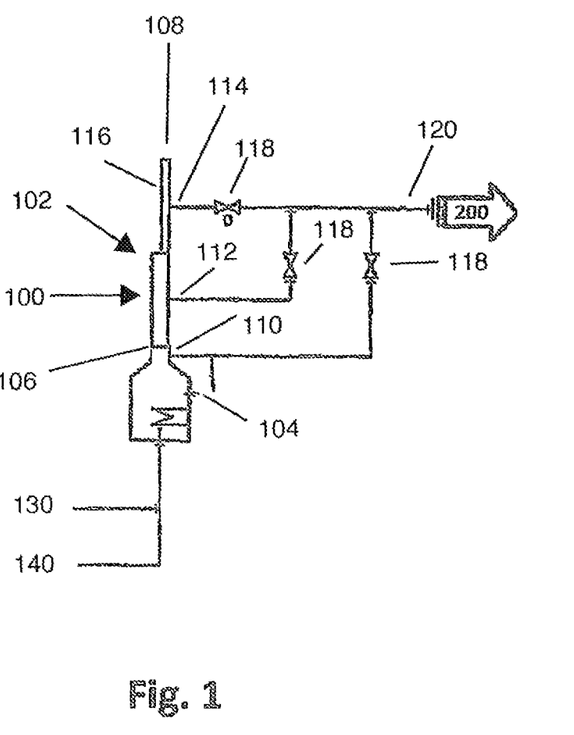
FIG. 1 shows a flue gas source and various options for diverting at least a portion of the flue gas from a flue gas source through a gas extraction structure.

Embodiments of the present invention may be applied for carbon dioxide capture from any flue gas source. As one example, FIG. 1 shows a flue gas source 100 in which the flue gas can be extracted at a variety of different points in a stack 102. Extraction of the flue gas from different points in the stack 102 provides additional flexibility in controlling the cooling and/or dilution of the flue gas as it leaves the flue gas source 100. However, as discussed in greater detail below, some embodiments of the invention provide for controlling the temperature through different mechanisms downstream of the flue gas source 100. Embodiments of the invention which have these mechanisms do not require the multiple extraction structures depicted in FIG. 1, but may simply take flue gas directly from the flue gas source 100 through outlet 104.

With respect to the embodiment of the invention which provides for multiple extraction points from flue gas source 100, lower extraction point 110 depicts extraction at an existing nozzle or branch or sample tap off below the existing stack tip 106. Middle extraction point 112 is located in a portion of venting stack 102 where the venting stack is at full diameter. Upper extraction point 114 is located at a "partial pipe" 116 or a sliced pipe of partial stack diameter, or a fully round pipe of partial diameter within venting stack 102. Middle extraction point 112 and upper extraction point 114 are above the existing flue gas stack tip 106, but below top 108 of the venting stack 102. Middle extraction point 112 and upper extraction point 114 may be uncapped or capped via a hinged closure device, attached onto the new stack tip.

The gas stream taken through lower extraction point 110, because of the location for its extraction, will be solely flue gas having a high flowing temperature. However, gas streams taken from middle extraction point 112 and upper extraction point 114 will be diluted because the locations of the extraction points will allow dilution of the extracted flue gas from top 108 of the venting stack 102. The gas stream taken through upper extraction point 114 will be subjected to maximum dilution and cooling because the volume of ambient air drawn into the gas stream may range from a fraction of the volume of the extracted flue gas up to multiple volumes more of the flue gas volume.

Partial pipe 116 may be configured, either manually or automatically, to open and close. In addition, the orientation of the open portion may be repositioned manually or automatically. This ability to adjust the magnitude and orientation of the opening of the partial pipe section allows for adjusting the opening, thereby having some control of the volume of dilution air utilized for adjusting the CO2 concentration and temperature of the gas stream leaving flue gas source 100, and making adjustments base upon wind speed and direction. In some embodiments, the orientation of the partial pipe section may be repositioned based on wind speed/direction.

Each line attached to extraction points 104, 110, 112, 114 may have a valve 118 for isolation or proportionating of the gas streams taken from each extraction point. These valves are low pressure drop light weight butterfly and/or wafer valves suitable for the operating and design conditions of the process. They can be manually operated with devices from grade or at platforms nearby the valves, or automatically controlled by pressure, concentration, temperature, flow, or other process condition monitoring devices.

The ducting 120 shown in FIG. 1 can be of a single diameter size equal to or even greater than the stack, or manifold into multiple smaller sized diameter ducting. The multiple smaller sized diameter ducting provide the advantage of a higher external surface area than a single large duct to facilitate increased cooling and condensation by contact of the outside of the ducting with ambient air. Flue gas source 100 receives air from an air source 130 and fuel from a fuel source 140.

Discharge from flue gas source 100 is directed to flue gas receiving station 200. It is to be appreciated that a cooling means is desirable which reduces the temperature of the gas stream in ducting 120 before the gas stream reaches the first blower 210 and membrane module 212 (or inline leaf membrane) depicted in FIG. 2. This cooling means may be realized through air dilution or the "radiator" effect achieved by relatively long run of ducting 120 between the flue gas source 100 and first blower 210 depicted in FIG. 2. The determination of the necessary length of ducting 120 can be determined from the temperature of the gas stream leaving the flue gas source 100 (including the contribution of any dilution gas provided at the stack 102 as described above), the velocity of the gas stream, the ambient outside temperature, and the mechanical configuration of the ducting (e.g., dimensions, heat transfer coefficient). The gas stream must be sufficiently cooled and liquids dropped out before the cooled gas stream reaches first blower 210 and membrane module 212, because both can be adversely impacted by a high liquids content and/or a high temperature. Membrane module 212 increases the CO2 concentration to a level appropriate for distribution to plants. Second blower 214, in conjunction with first blower 210, maintains pressure in membrane module 212, yielding an adequate residue flow to vent 216.

Alternatively, particularly in situations where the flue gas source 100 is closely coupled to the plants to be treated with CO2 (with the flue gas receiving station 200 even closer) various cooling mechanisms may be utilized, such as conventional heat exchangers, including shell and tube heat exchangers, finned fan coolers, and other varieties of heat exchanger utilized for gas processing and transportation.

Figure 1A:
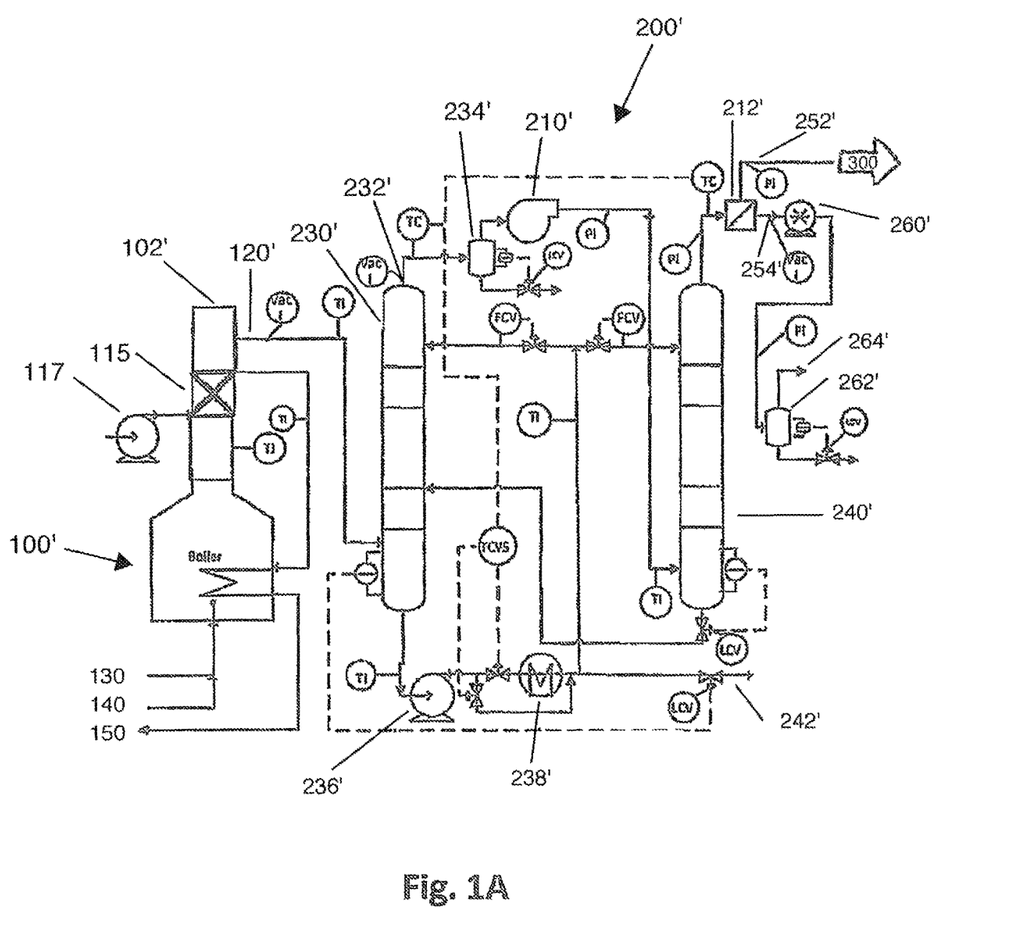
FIG. 1A shows a combined flue gas source/flue gas receiving station in which flue gas is directed to quenching towers for cooling prior to distribution.

Alternatively, a system such as that depicted in FIG. 1A may be utilized, which shows a flue gas source 100' combined with a flue gas receiving station 200' having a dedicated cooling and membrane system. In this embodiment, flue gas source 100' may comprise economizer 115. Economizer 115 is heat exchanger which saves on fuel gas by preheating boiler feed water from ambient temperature on the tube side up to approximately 200 degrees Fahrenheit, utilizing hot stack gas on the shell side. Economizer 115 also reduces stack gas temperature. With or without economizer 115 being utilized, a boiler feed water pump 117 is utilized. This embodiment will also comprise a steam discharge line 150. While there is a small pressure drop in the flue gas stream across economizer 115, venting stack 102' is otherwise opened to the atmosphere. In this embodiment, substantially all of the gas stream flowing through venting stack 102' is discharged through an upper conduit 120'.

Upper conduit 120' delivers hot extracted gas having a temperature of approximately 300 degrees Fahrenheit to a first quench column 230' and to a second quench column 240', each column utilizing direct contact with cooled quench water to cool hot stack gas fed into the quench column. The number of stages in first quench column 230' and second quench column 240' may be varied according to the cooling requirements. As depicted in FIG. 1A, the quench water may be recirculated through first quench column 230' and second quench column 240' by utilizing quench water pump 236'. Quench water may be cooled with quench water cooler 238'. Quench water may also be discharged for crop irrigation through discharge line 242'.

Figure 8:
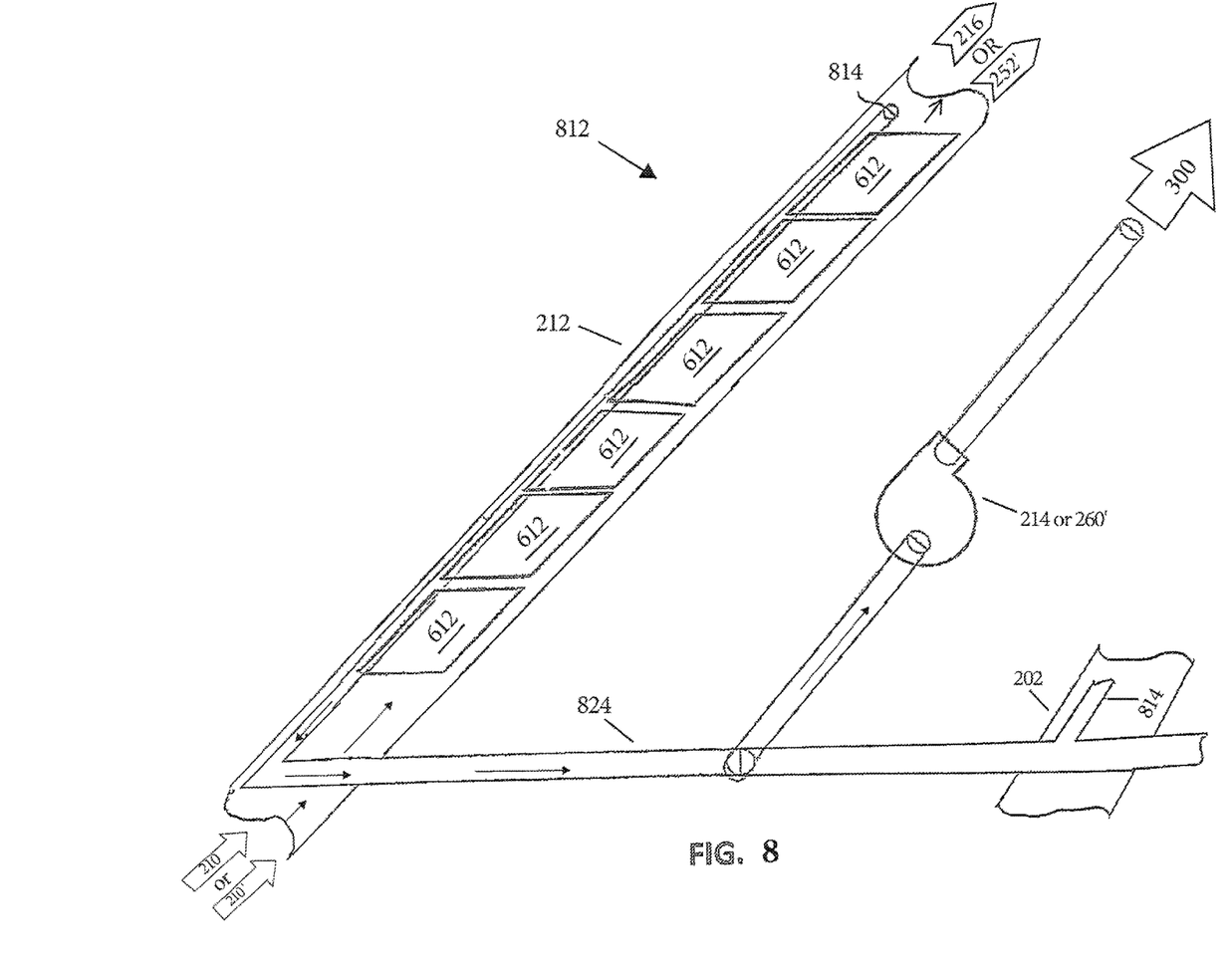
FIG. 8 schematically depicts the simplest form of an embodiment of an inline leaf membrane contained within a duct with the permeate collection piping penetrating the duct.

By way of example, hot flue gas may enter first quench column 230' at a temperature of approximately 300 degrees Fahrenheit and may be cooled to a temperature range of 80 to 110 degrees by first quench column 230'. Cooled flue gas exits first quench column 230' through outlet 232' and into condensate knock-out drum 234'. Blower 210' may be utilized to boost the pressure of the flue exiting first quench column 230' for inputting into second quench column 240'. Upon discharge from second quench column 240', cooled gas at a temperature of approximately 110 degree Fahrenheit is directed into conventional membrane module 212'. An inline leaf membrane module 812, as depicted in FIG. 8 may be utilized in place of membrane module 212', as described later in the description of FIG. 2.

A "residue" gas stream having a reduced concentration of CO2 (e.g., a stream having 2% CO2) may exit membrane module 212' through outlet 252' at a pressure of approximately 1 psia. This gas stream may be directed to distribution array 300 for local crop enrichment. A liquid ring (vacuum) compressor 260' may apply vacuum to the "permeate" gas stream 254' of membrane module 212' and recover a gas stream having a higher concentrated level of CO2 (e.g., a stream having 43% CO2, higher concentration than the "Residue" Stream). This stream of concentrated CO2 may be directed to knockout drum 262' and then transported via smaller diameter ducting 264' over longer distances for crop enrichment.

Figure 4:
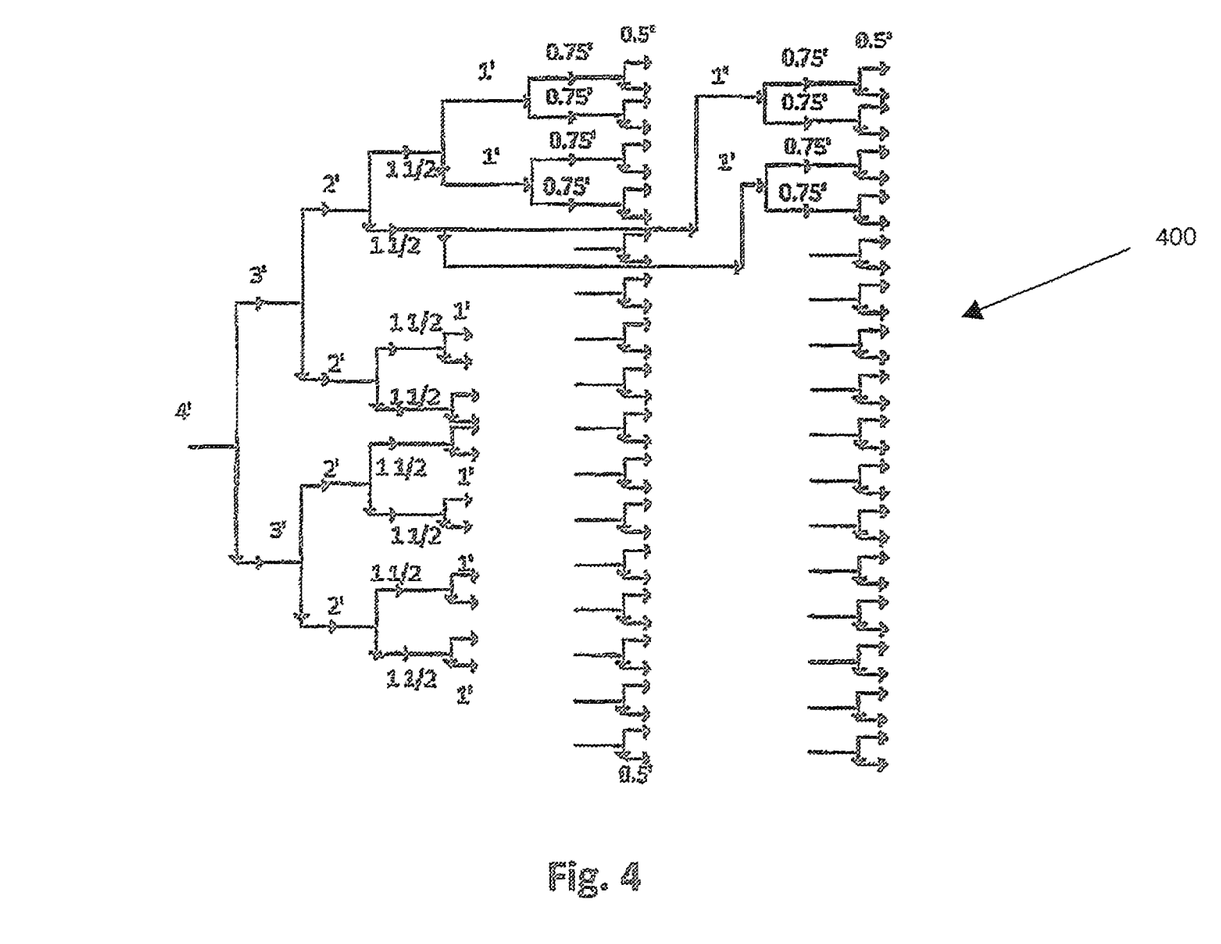
FIG. 4 depicts a detailed view of an example of a configuration of round robin pipe branching which may be utilized in a duct spacer sheet.

The ducting 202 can be manifolded or branched round robin style into a system 400 comprising multiple smaller sized diameter ducting as shown in FIG. 4. These multiple smaller sized ducting can be bundled and/or spaced and/or arranged into ducting banks such as those shown in FIG. 2. Round robin pipe branching ("RRPB") or channel (manifold) boxes can be used to make the duct bank from the largest stack dimension lateral. The sizes indicated in FIG. 4 are the minimum count of smaller sized duct for equivalent pressure drop. For example, if the diameter of the stack is 4', use 64 count of selected smaller diameter duct of 0.5' as illustrated in FIG. 4. As another example, for a 2' stack, use 8 count of selected smaller diameter duct of 0.75'. The RRPB reverses to rejoin to the stack dimension lateral.

Figure 5:
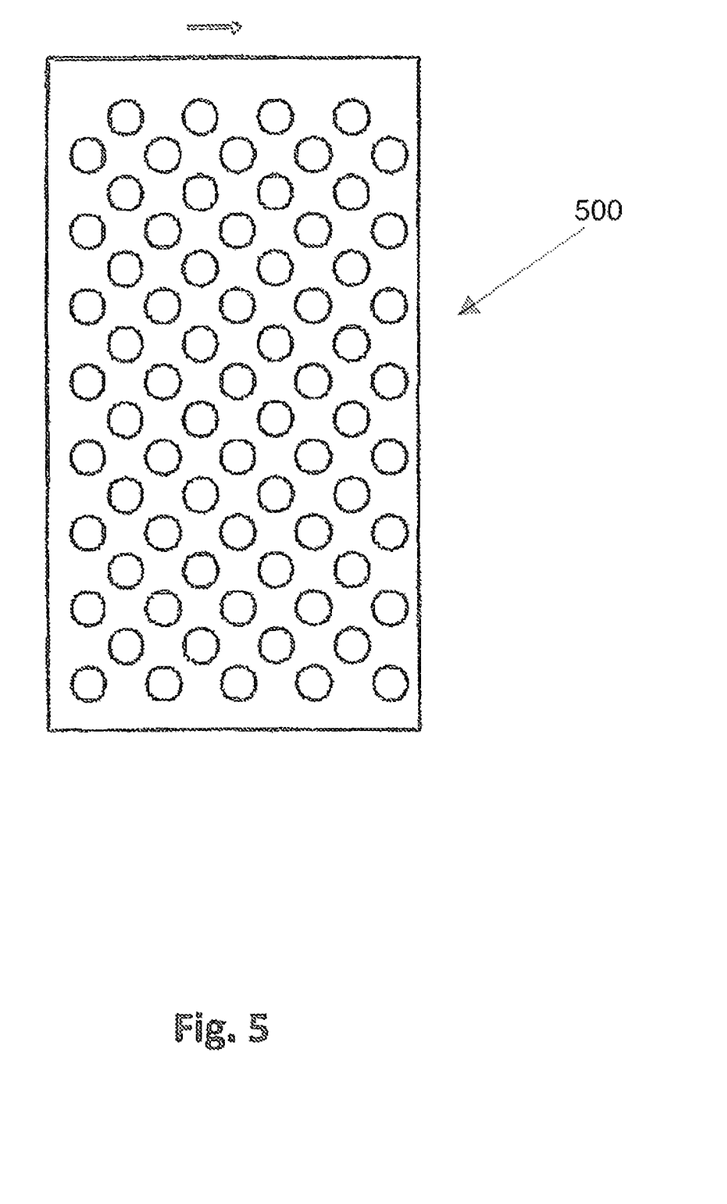
FIG. 5 depicts a configuration of a duct bank within a spacer sheet which may be utilized in cooling the gas mixture.

The bank may include a duct spacer sheet 500 (i.e., a perforated plate) which holds the ducting at a prescribed distance and at a prescribed orientation as detailed in FIG. 5. The smaller sized ducting can be manifolded or round robined back into a single larger sized ducting 220 or lateral as shown as leaving the duct bank shown in FIG. 2. In the embodiment shown in FIG. 2, improved ambient cooling is achieved from the increased area provided by the banks of multiple smaller diameter ducts.

Figure 2:
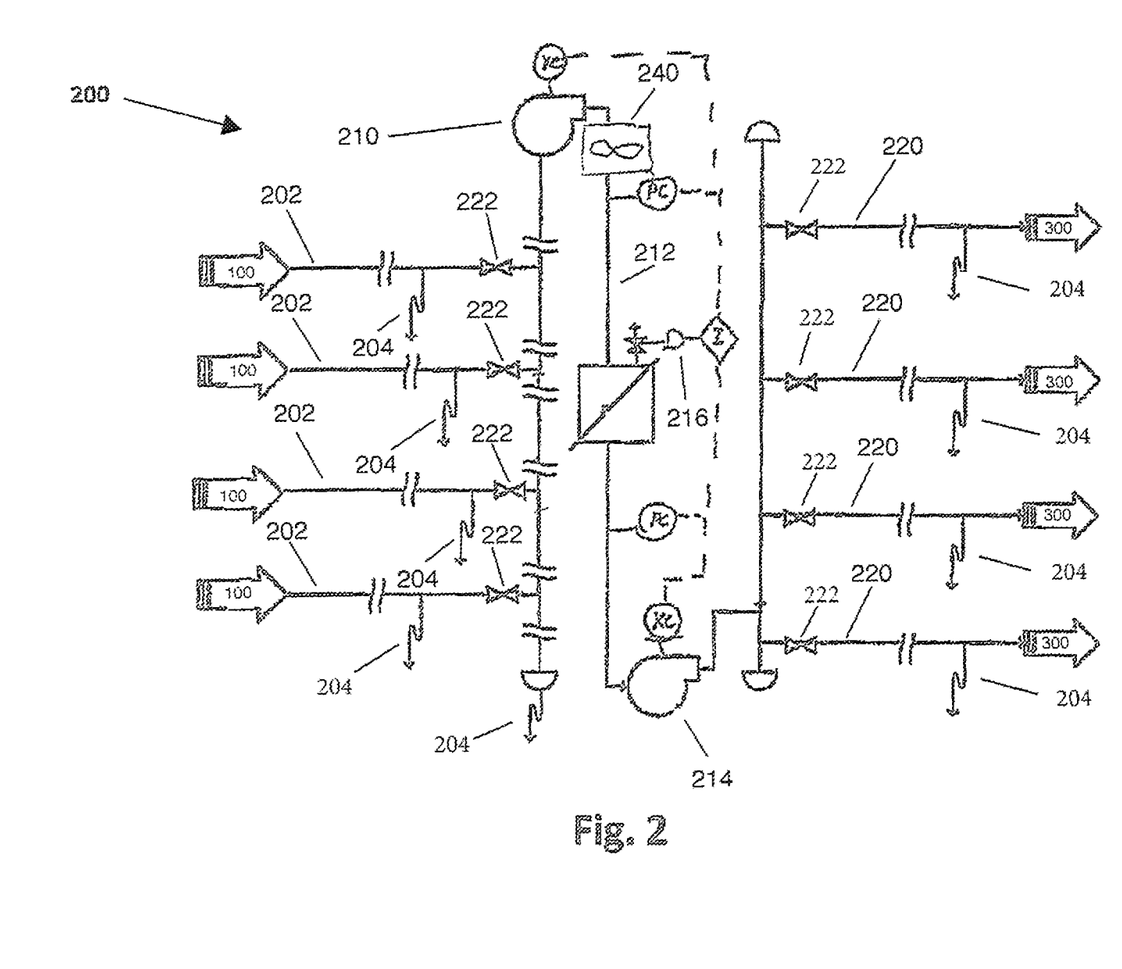
FIG. 2 shows an embodiment of a flue gas receiving station which receives flue from the flue gas source of FIG. 1.

Alternatively, ducting 202 may comprise large bore light weight ducting, which could be hung off of poles, and which may be under a hundred feet to several miles in length. Alternatively, ducting 202 may be transversely finned to increase external surface area and thus enhance cooling of the internal gas with improved heat transfer to the ambient air. These laterals have simple manometric traps 204 located at appropriate spacing and at all low points to facilitate water condensate drainage. The manometric traps 204 are common "P-Trap" devices with snake shaped piping to facilitate collection of a trapped liquid condensate water liquid to facilitate containment of the flue gas with a manometric leg of water. This trapped manometric leg of liquid water will need to be monitored and may need to be replenished over periods of time to prevent excessive leakage of flue gas. The traps may also be monitored with local or automated level indication and control using automated valves at the exit tip of the trap to indicate and assure that a level is maintained within the trap.

In FIG. 2, valves 222 are used to isolate and/or proportionate diluted and cooled flue gas incoming from flue gas source 100 and flowing to the suction side of booster blower 210, through air cooler 240 to reduce the membrane feed to below 115 F, and then flowing to conventional membrane module 212 or an inline leaf membrane 812, such as that depicted in FIG. 8, as utilized in place of membrane module 212. The second blower 214 draws a concentrated CO2 stream (up to 40% CO2) as permeate through the membrane and into blower 214's suction and into smaller ducting for more distant orchards. The depleted CO2 stream passes through outlet 216, and still has sufficient CO2 (about 2%) for crop carbon enrichment of nearby orchards through larger ducting.

Figure 3:
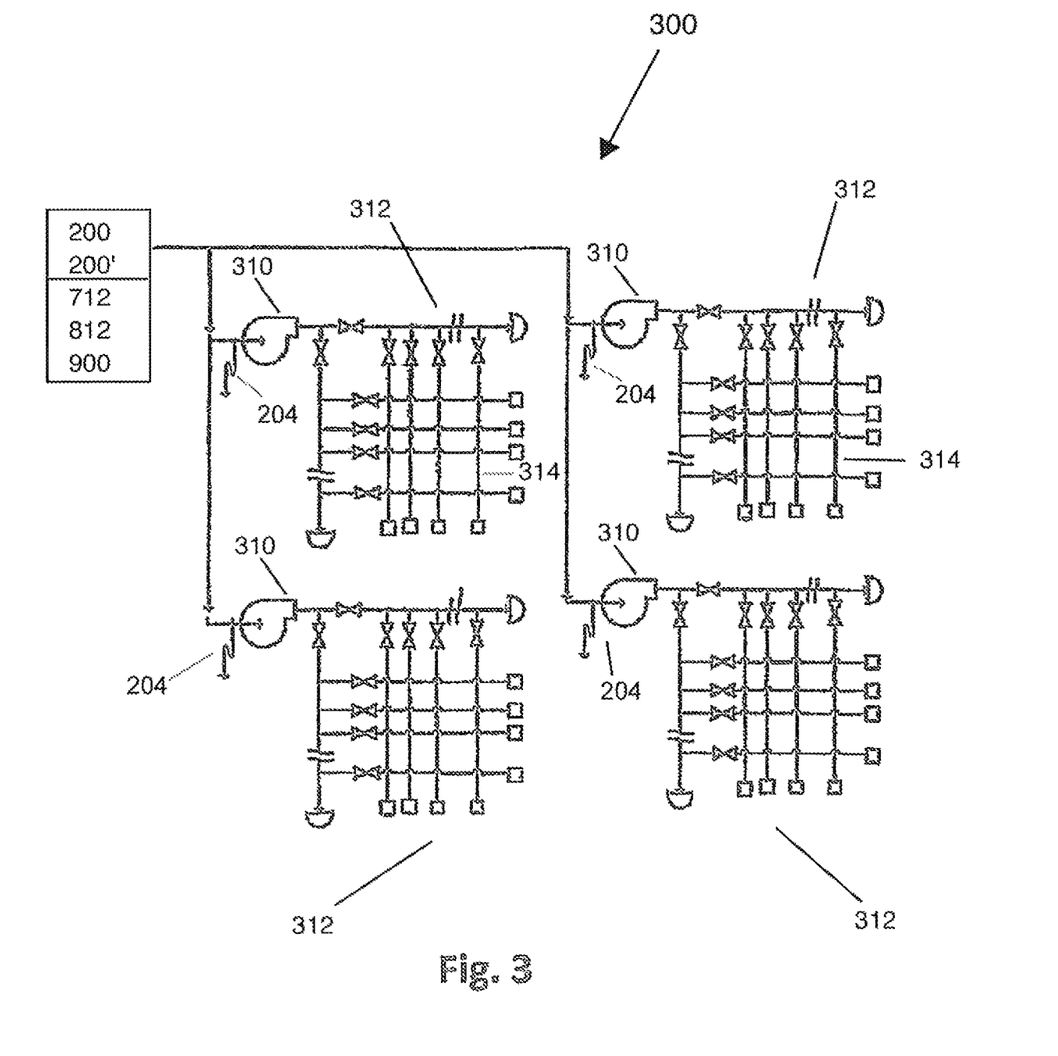
FIG. 3 depicts an embodiment of a distribution system for distributing a carbon dioxide enriched gas for release in facilities containing photosynthetic organisms.

In FIG. 3, optional additional booster blowers 310 draw diluted, dewatered, and possibly pressure/flow boosted flue gas from the more concentrated permeate bearing streams 220 and 264' of the flue gas receiving stations 200, 200' on FIGS. 2 and 1A, respectively, as required. Blowers 310 may also draw a less concentrated, yet enriched carbon dioxide residue product streams 216 and 252' from membrane modules 212, 212'. Alternatively, blowers 310 may draw a carbon dioxide stream from direct air capture or inline leaf membrane units or systems 712, or 812 as respectively depicted in FIGS. 7 and 8. Blowers 310, which are smaller blowers 210, 214 may be solar powered. Blowers 310 feed one or more arrays 312 of ducting headers and laterals to distribute the carbon-dioxide gas through laterals 314 with perforations. These array laterals 314 supply diluted (or enriched if desired), cooled, dewatered flue gas to desired temperatures, moisture levels, and CO2 concentrations, which may be manually manipulated or automated. Manipulation of the valving may be as needed, for example, due to changes in wind speed and direction, or lack of wind altogether to accomplish optimal cooling/dilution/distribution/use of the flue gas exiting the array in the midst of the photosynthetic organisms, such as in an orchard comprising fruit trees, by virtue of release to ambient atmosphere in the vicinity of the flora desired to be enhanced. Containment of the carbon dioxide in the zone around the photosynthetic organisms may be accomplished with wind screens, sheeting, and similar materials.

The flue gas typically comprises 100,000+ ppm (10+%) CO2. When diluted with ambient air having a CO2 concentration of 400 ppm, the resulting CO2 reaching the crops or orchard will reach an approximate sweet spot concentration of about 1000 ppm. This concentration may be maintained by bounds the edges (not the top) of any portion of the crop or orchard with a thin (most likely plastic film) barrier to minimize the impact of wind and contain the enriched gas within the area of the crop or orchard. If desired, this "crop gas" or "orchard gas" can be funneled into ducting attached to points in this barrier which sends the gas to blowers that sweep the orchard gas back into the same quench/membrane/liquid ring compressor system, which then re-concentrates and recycles the gas back to the crop or orchard at a CO2 concentration of approximately 3000 ppm, thus minimizing the amount of imported flue gas to the orchard.

Figure 6:
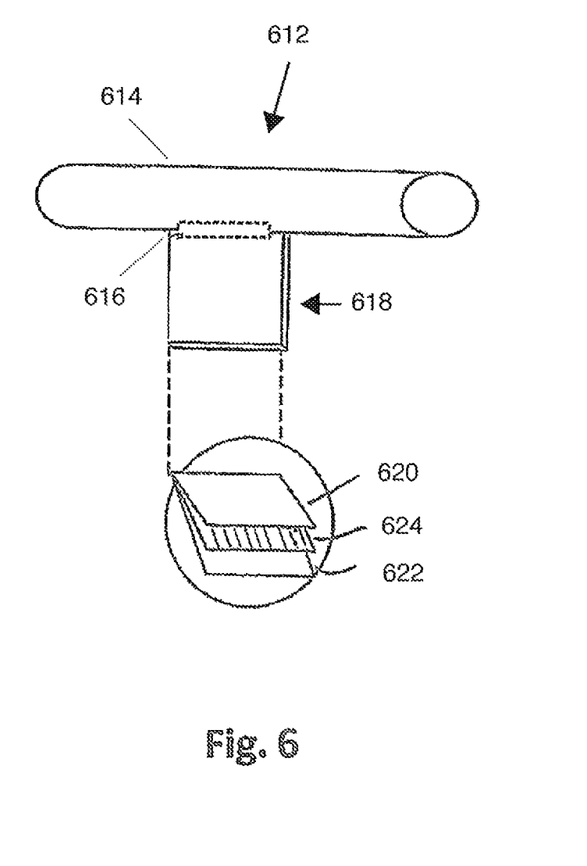
FIG. 6 depicts the simplest form of a direct air capture leaf membrane module utilized exterior to a piping or ducting which provides direct air capture of carbon dioxide from the atmosphere, which may be utilized in conjunction with embodiments of the present invention, with a detailed depiction of the expanded membrane element structure depicted within the circled portion
Figure 7:
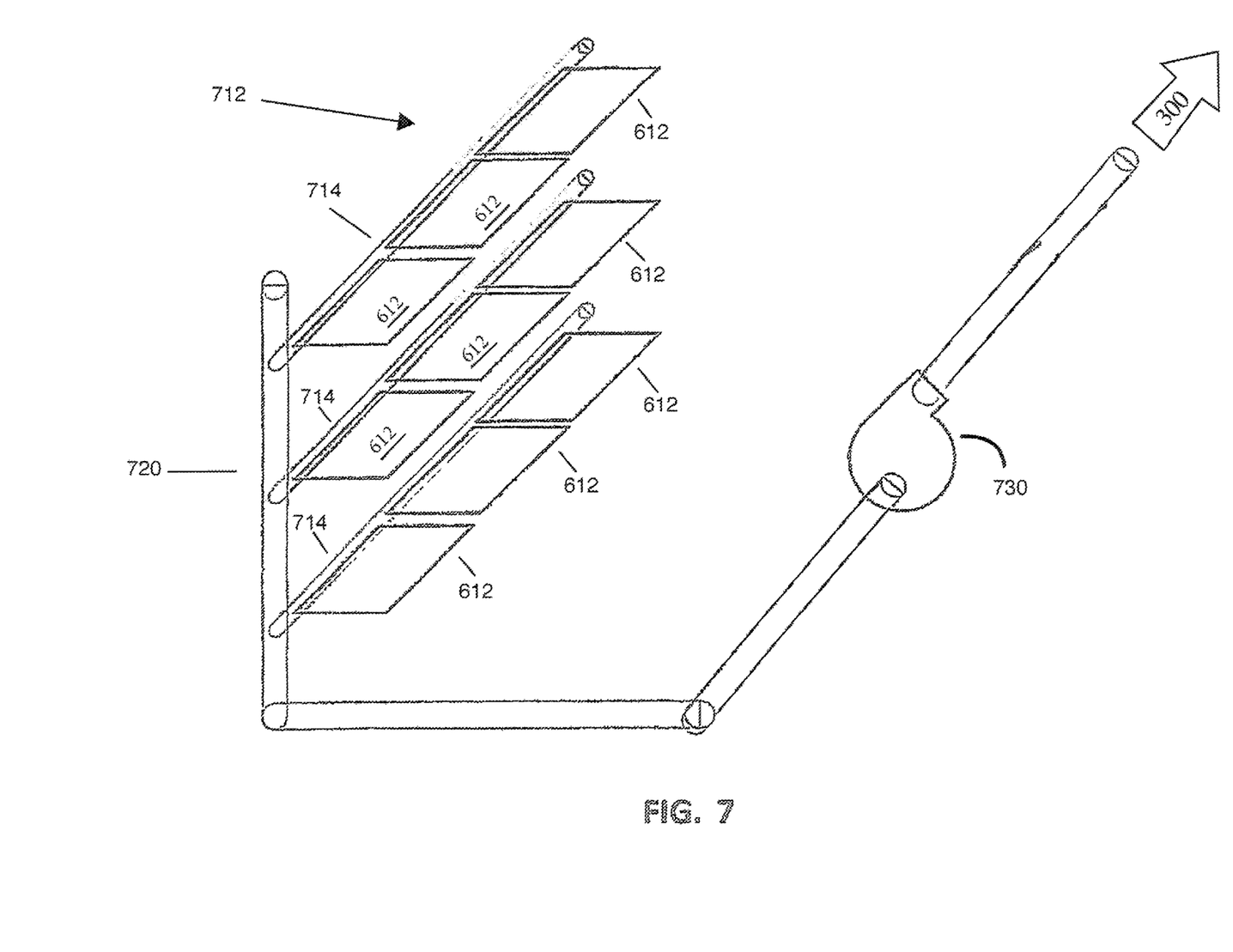
FIG. 7 depicts an embodiment of a direct air capture multiple leaf membrane unit or system utilized exterior to a piping or ducting which provides direct air capture of carbon dioxide from the atmosphere, which may be utilized in conjunction with embodiments of the present invention.

FIG. 6 provides details regarding the structure of the simplest form of a leaf or sheet membrane module utilized in membrane units or systems shown as 712 and 812 on FIGS. 7 and 8. These units are utilized to increase the CO2 concentration by producing a permeate stream collected in permeate collection piping headers 714 and 814, and permeate collection mains 724 and 824. In FIG. 6, leaf membrane module 612 has a slotted permeate collection pipe 614 having a permeate collection pipe slot 616. A sheet membrane element 618 may have a top membrane sheet 620, and a bottom membrane sheet 622 glued only on three sides to a ribbed sheet 624, where a top permeate channel is defined between the top membrane sheet 620 and the ribbed sheet 624 and a bottom permeate channel is defined between the bottom membrane sheet 622 and the ribbed sheet. The forth side of membrane element 618 not glued comprising open ends of the top and bottom membrane envelopes extend over the permeate collection pipe slot 616.

In FIG. 7 with a direct air capture operation membrane unit 712, and as depicted in FIG. 6, ambient air passes over the outside of the top and bottom membrane sheets 620 and 622 and CO2 rich permeate is sucked through the top and bottom membrane sheets 620 and 622 of membrane element 618 through the permeate channels in the ribbed sheet 624 and into the permeate collection pipe slot 616 and into the permeate collection pipe 614. Top membrane sheet 620 and the bottom membrane sheet 622 can be fabricated from any of several thin single or multi-layered materials, such as cellulose acetate or polyimide. The ribbed sheet 624 is fabricated from a common sturdy plastic, such as polycarbonate. In this regard, it should be noted that the materials and structure utilized in the leaf membrane are the same as utilized in spiral wound membranes currently manufactured by Honeywell and MTRI, except the structure is a flat non-spiral wound structure not requiring the supporting structures found in a spiral wound membrane module. It is to be noted that the top membrane sheet 620, bottom membrane sheet 622, and ribbed sheet 624 are each glued on three sides with the open or unglued edges facing slot 616 of slotted permeate pipe 614 forming top and bottom envelopes. It is further noted that ribbed sheet 624 comprises ridges which are oriented in the flow direction toward slot 616. Feed passes over the membranes with the more concentrated permeate gas passing through the top membrane sheet 620 and bottom membrane sheet 622 into their respective envelopes and is channeled down the membrane envelopes into the slotted permeate collection pipe 614.

In FIG. 7, the direct air capture membrane unit 712 comprises a three by three matrix of sheet membrane modules 618, with all 9 sheet membranes having both ends of the slotted permeate collection pipe 614 open. Each is attached to permeate collection 714 each of which ties into common line 720. Collection headers 714 are closed ended on the end opposite to the common line 720. A blower 730 produces a vacuum inside sheet membranes 718. Blower 730 provides enriched CO2 from ambient air at approximately 1200 ppm, which may be delivered to crops, plants, trees, or greenhouse.

FIG. 8 shows an inline leaf membrane 812 contained within ducting 202, such as that depicted in FIG. 2, in which a stream of gas containing CO2 is flowing. Inline leaf member 812 has the same structure as direct air capture membranes 712, but rather than being direct air capture, inline leaf membrane 812 collects and concentrates CO2 from a flowing gas stream within a duct, which usually already has an elevated level of CO2. In this depiction in FIG. 8, six leaf membrane modules are shown serially connected within the duct by header 814, which ultimately penetrates ducting 202 to join main 824. The enriched more concentrated CO2 flows out through permeate collection pipe 814 into permeate collection header 824.

In contrast to conventional membrane modules, which are packaged units, the leaf membrane units 712 and 812 simply need to be supported and, if inside ducting, requires a penetration in the ducting to allow extraction of the permeate. Embodiments of the leaf membranes units 712, 812 can be free standing in atmosphere, placed in a plume of a stack, placed for direct air capture in simply an open field, as suitable for the embodiment depicted in FIG. 7, or placed within a pressurized line as depicted in FIG. 8. If placed inside of ducting as depicted in FIG. 8, a residue stream results which is depleted in CO2 and oxygen, which forms a good source for feed to an air separation unit, as it would be rich in nitrogen. A rain and sun shield may be provided for embodiments such as those depicted in FIGS. 6-7 to provide protection from the weather.

For leaf membranes contained in ducts, there is an additional benefit in that the selectivities of the membrane improve by allowing pressure to be raised above ambient, while providing the direct benefit of not needing a module, and other devices, such as a condenser, and not being space or size limited. Selectivities are a function of the concentration of both the permeate and residue.

Figure 9:
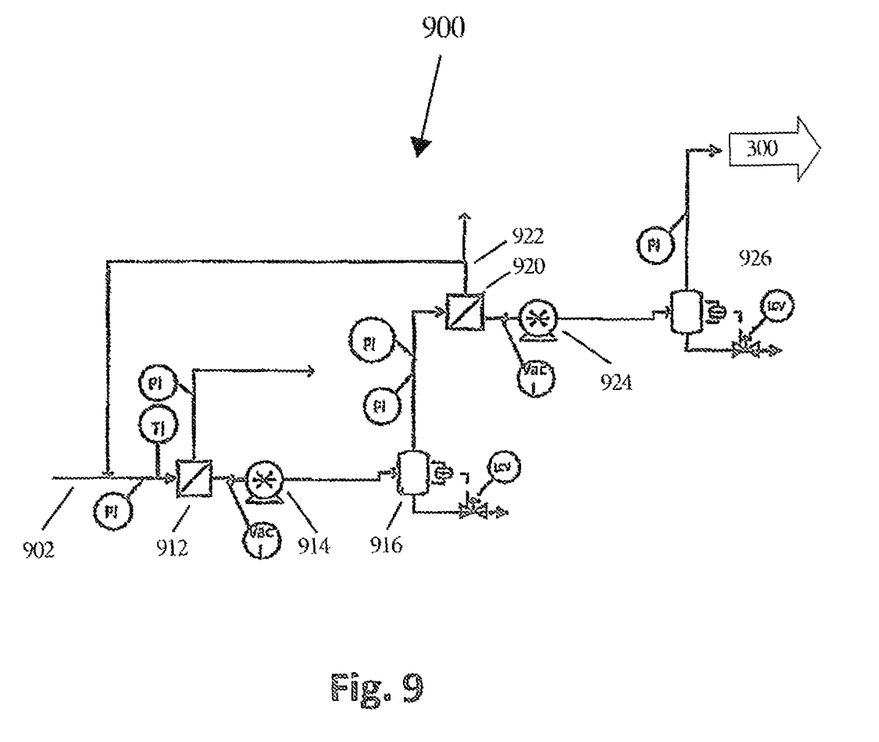
FIG. 9 depicts an embodiment of multi-staged membrane modules in a membrane unit utilizing a liquid ring compressor.

FIG. 9 depicts an embodiment of a multi staged membrane unit 900 utilizing a liquid ring compressor. In this embodiment, a feed gas comprising flue gas or air enters inlet 902 having a pressure of 0-2 psi and a temperature of approximately 110 degrees Fahrenheit. The feed gas is directed into first membrane module 912, which has a vacuum applied to it by blower 914, which discharges a gas stream having a higher CO2 concentration than the feed gas. The enriched gas flows into a stage one knock-out drum 916 and then directed to second membrane module 920, which separates the enriched gas into a less concentrated stream which is either vented to atmosphere or recycled through outlet 922 and much higher CO2 concentrated enriched stream which, with vacuum applied by blower 924 is directed to knock-out drum 926. The gas stream exiting knock-out drum 926 is then directed as desired to crops.

While the above is a description of various embodiments of the present invention, further modifications may be employed without departing from the spirit and scope of the present invention. Thus the scope of the invention should not be limited according to these factors, but according to the following appended claims.

What is claimed is:

1. A system for capturing carbon dioxide and distributing the carbon dioxide to a first facility comprising photosynthetic organisms, the system comprising:
    an outlet discharging a gas stream containing carbon dioxide, nitrogen and oxygen from a flue gas source;
    a cooling apparatus selected from the group consisting of quench columns, shell and tube heat exchangers, and finned fan coolers wherein the cooling apparatus receives and cools at least a portion of the gas stream flow from the gas capturing structure outlet, resulting in a cooled gas stream comprising carbon dioxide, nitrogen and oxygen;
    a carbon dioxide enrichment membrane configured to receive at least a portion of the cooled gas stream, wherein the carbon dioxide enrichment membrane separates the at least a portion of the cooled gas stream into a first permeate stream comprising a higher concentration of carbon dioxide than in the cooled gas stream and a residue stream comprising a higher concentration of nitrogen than in the cooled gas stream;
    a blower disposed between the cooling apparatus and the carbon dioxide enrichment membrane;
    a manometric trap disposed between the cooling apparatus and the blower;
    a first permeate duct which receives the first permeate stream; and
    a first distribution array connected to the first permeate duct, the first distribution array connected to the first facility comprising photosynthetic organisms, wherein the first permeate stream may be selectively discharged amidst the photosynthetic organisms.

2. The system of claim 1 wherein the residue stream is received by a second facility comprising photosynthetic organisms.

3. The system of claim 1 wherein the carbon dioxide enrichment membrane comprises a permeate collection pipe.

4. The system of claim 3 wherein a liquid ring compressor applies a vacuum to the permeate collection pipe.

5. The system of claim 1 wherein the carbon dioxide enrichment membrane comprises a leaf membrane.

6. The system of claim 1 wherein the carbon dioxide enrichment membrane comprises a tubular membrane.

7. The system of claim 1 wherein the carbon dioxide enrichment membrane comprises a flat sheet membrane.

8. The system of claim 1 wherein the carbon dioxide enrichment membrane comprises a hollow fiber membrane.

9. The system of claim 1 wherein the carbon dioxide enrichment membrane comprises a sheet membrane module comprising a permeate collection pipe having a permeate collection pipe slot and a membrane element comprising a top membrane sheet, a bottom membrane sheet and a ribbed sheet sandwiched between the top membrane sheet and the bottom membrane sheet.

10. The system of claim 1 wherein the first permeate stream is discharged through a network of perforated tubing.

11. A system for capturing carbon dioxide and distributing the carbon dioxide to a facility comprising photosynthetic organisms, the system comprising:
- an outlet discharging a gas stream containing carbon dioxide, nitrogen and oxygen from a flue gas source;
- a cooling apparatus selected from the group consisting of quench columns, shell and tube heat exchangers, and finned fan coolers, wherein the cooling apparatus receives at least a portion of the gas stream flow from the outlet, resulting in a cooled gas stream;
- a manometric trap configured to receive any liquids from the cooled gas stream, resulting in a cooled and dried gas stream;
- a blower configured to receive the cooled and dried gas stream, said blower increasing the pressure of the cooled and dried gas stream resulting in a feed gas stream comprising carbon dioxide, nitrogen and oxygen;
- a carbon dioxide enrichment membrane configured to receive the feed gas stream, wherein the carbon dioxide enrichment membrane separates the feed gas stream into a first permeate stream comprising a higher concentration of carbon dioxide than in the feed gas stream and a residue stream comprising a higher concentration of nitrogen than in the feed gas stream;
- a first permeate duct which receives the first permeate stream; and
- a distribution array connected to the first permeate duct, the distribution array connected to the facility comprising photosynthetic organisms, wherein the first permeate stream may be selectively discharged amidst the photosynthetic organisms.

12. The system of claim 11 wherein the carbon dioxide enrichment membrane comprises a leaf membrane.

13. The system of claim 11 wherein the carbon dioxide enrichment membrane comprises a tubular membrane.

14. The system of claim 11 wherein the carbon dioxide enrichment membrane comprises a flat sheet membrane.

15. The system of claim 11 wherein the carbon dioxide enrichment membrane comprises a hollow fiber membrane.

16. The system of claim 11 wherein the cooling apparatus comprises a heat exchanger disposed between the gas extraction structure and the manometric trap.

17. The system of claim 11 wherein the cooling apparatus comprises a quench cooling tower.

18. The system of claim 11 wherein the carbon dioxide enrichment membrane comprises a sheet membrane module comprising a permeate collection pipe having a permeate collection pipe slot and a membrane element comprising a top membrane sheet, a bottom membrane sheet, and a ribbed sheet sandwiched between the top membrane sheet and the bottom membrane sheet.

* * * * *